April 12, 1966 P. COSTE 3,245,199
MACHINE FOR THE FILLING AND CLOSING OF HOLLOW BODIES OF
PLASTIC FOIL MATERIAL
Filed July 10, 1962 5 Sheets-Sheet 1

Fig.1

Inventor:

April 12, 1966 P. COSTE 3,245,199
MACHINE FOR THE FILLING AND CLOSING OF HOLLOW BODIES OF PLASTIC FOIL MATERIAL Filed July 10, 1962

Inventor:

Peter Coste

3,245,199
MACHINE FOR THE FILLING AND CLOSING OF HOLLOW BODIES OF PLASTIC FOIL MATERIAL
Peter Coste, Ligornetto, Tessin, Switzerland, assignor to Rhenopack G.m.b.H., Ludwigshafen (Rhine), Germany, a corporation of Germany
Filed July 10, 1962, Ser. No. 208,713
Claims priority, application Germany, July 11, 1961, F 20,512
11 Claims. (Cl. 53—67)

The invention relates to a machine for the filling and closing of containers, in particular in bottle form, manufactured from synthetic plastic foil, the containers being conveyed by means of an endlessly rotating conveyor chain from the feed station to the delivery point and successfully passing the filling station and the closure station during their travel.

There are many variants of containers and bottle filling devices and also of closure devices for filled containers. With these devices, the containers to be filled are filled during their movement along a predetermined rectilinear or alternatively circular path, in that the generally liquid or pasty material is introduced from a proportioning cylinder and through a filling tube into the containers. In the case of the conventionally-used containers, what are concerned are relatively stable and robust containers, so that the filling and, where appropriate, the closing thereof (which generally takes place by means of an independent machine) does not involve any difficulty.

The position is entirely different in the case of containers, in particular containers in bottle form which are manufactured from a thin plastic foil, for example by the inflation of two foil parts connected with each other by welding and making use of a machine according to U.S. Patent No. 3,013,301. These containers are in no way sufficiently rigid and resistant to permit their being filled and closed with the aid of the conventional machines. Thus, it is also not possible to send such containers, in particular bottles, individually through a corresponding prior-known machine.

For the filling and closing of these containers which are sensitive at least during filling and closing, a special machine has been developed and this machine is the subject of the invention. It has been found to be expedient in each case to leave for example 2, 3 or even 4 bottle-shaped containers in a foil strip and in every case to treat the containers joined together in this manner as a unit; after they have been filled and closed, they are cut out of this foil strip along their external contours. The corresponding treatment of individual containers of the kind in question which have been manufactured from synthetic plastic foil is made possible if the machine according to the invention is changed for this purpose.

The machine according to the invention is designed in such manner that the conveyor chain, which is equipped with carrier plates and drive pins or retaining means reliably securing the containers in some other appropriate manner or with dished members or the like which may if required receive the individual containers, is guided about two horizontal guide pulleys formed with toothed rims, the filling device being disposed above one of the said guide pulleys and the closure device above the other of the said pulleys, the two said devices rotating with the pulleys and being controlled by a supervising and signalling device in the same way as the feed or ejection device.

The feed device of the machine according to the invention for the filling and closing of containers, in particular bottles, manufactured from plastic foils and preferably joined together in threes or fours in each case or, if required, joined together in pairs so that they are manufactured in a foil strip and thus constitute a chain of containers, consists of a conveyor belt which is adjustable as to inclination and which comprises a plurality of (at least two) endlessly rotating V-belts extending parallel to each other, there being disposed at the upper deflection point of the said conveyor belt, at the points between each two of the containers disposed side by side in the foil strips and in the planes of the V-belts the upper ends of parallel guide rods arranged in a plane perpendicular with respect to the foil strip plane and the lower ends of which terminate in a supply device above the feed station of the container on the conveyor chain. For the feed of individual containers, there is for example a single conveyor belt which may have lateral sections and on both sides of which there may, if required, also be provided guide strips, this single conveyor belt conveying the containers into a vertical magazine shaft on the lower end of which again the aforementioned supply device is arranged. A plurality of such conveyor belts and magazine shafts can be arranged directly side by side.

The supply device is formed by two catch-plates which are so arranged that they can be vertically adjusted one above the other by an adjustable amount, are adapted to be moved forwardly and rearwardly in opposite directions, simultaneously, towards the vertical slide way of the foil strips and on which the bases of the containers drop and are retained by the said catch-plates in such manner that when the lower catch-plate is withdrawn, the container disposed upon it drops downwardly on to the conveyor chain and is carried by the latter through the machine; the next chain of containers standing in the feed device on the container chain which has just been fed on to the conveyor chain drops simultaneously and is recaught whilst falling by the upper catch-plate and retained until the point over the lower catch-plate is free, being deposited thereon when the catch-plates are again moved.

In this manner, a periodic feed of the individual container chains is effected. The control pins arranged on the conveyor chain in a spaced relationship which is dependent on the length of the foil strips or of the conveyor chain, control the supply device. If each foil strip contains for example three containers and the conveyor chain is so designed that each container of the conveyor chain has its own carrier plate with driving and supporting elements, then every third "link" of the conveyor chain carries, preferably on the lower side, a control pin which in place of the feed device controls or, if required, also directly effects the movement of the catch-plates of the supply device.

The containers fed to the conveyor chain are displaced by the latter from the feed point to the filling station proper arranged above the conveyor chain guide pulley. The per se known filling cylinders adapted to be moved upwardly and downwardly and having a filling tube dipping during the downward movement into the open necks of the containers are mounted on a drum rotating about its vertical axis in synchronism with the conveyor chain guide pulley. The known filling devices or filling cylinders are so designed that when the filling tube dips into a bottle and a disc arranged on the filling tube encounters resistance on the bottle mouth, the latter opens the discharge valve. A construction of this kind cannot, however, be used for the containers to be filled and closed by means of the machine according to the invention, since the bottles would be crushed due to their insufficient stability in the unfilled state.

In order to obviate these difficulties, it is proposed according to the invention to provide the filling cylinder which is adapted to be moved upwardly and downwardly for the purpose of filling the container with a feeler rod which, in the same way as the filling tube, is passed during the downward movement through an aperture in a disc disposed above the container to be filled. The aperture in the disc through which the feeler rod passes during the downward movement of the filling cylinder is adapted to be closed by a slide which is pushed in each case over the passage aperture under the lower end face of the feeler rod when a lever exploring the containers disposed on the conveyor chain has ascertained that there is no container at a point at which there should in fact be a container, because for example an interruption has taken place in the replenishment of the container chains. The lever exploring the containers mechanically or electro-mechanically controls a lever by means of which the slide on the disc is pushed over the passage aperture for the feeler rod.

The filling tube is preferably guided in a bearing bush mounted about which is a 2-armed pivotal lever the outer end of which projects above the disc and forms the said slide, whereas the inner arm of the lever closes the passage aperture for the feeler rod in the disc, thereby blocking the downward movement of the feeler rod and of the filling cylinder.

Disposed preferably at the inner end of the pivotal two-armed lever is a pin which projects into the passage aperture, designed as an elongated aperture, for the feeler lever in the disc. A recall member is then able to act on the end of the pin disposed below the disc with the result that the slide or the two-armed lever is always so positioned that the passage aperture for the feeler lever in the disc is free. During the downward movement of the filling cylinder with the filling tube, the valve plate thereof is then able to bear not, as is conventional, on the bottle mouth, but on the disc or on the bearing and guide bush disposed on the latter. If, however, a bottle is missing below a filling cylinder, the filling cylinder cannot be lowered with its filling tube at all, since the slide or the lever has previously closed the passage aperture in the disc for the feeler rod, so that the latter bears on the slide or the lever and any further movement in the downward direction is prevented.

After the containers have been filled at the filling station, they are fed from the conveyor chain to the closure station. The closure device is disposed along an arc of a circle above the second guide pulley of the endlessly rotating conveyor chain. Arranged, with the said guide pulley at an appropriate height above the conveyor belt and the container disposed thereupon, is a plate or the like on which are disposed on the one hand, through the agency of insulators, the fixed inner electrodes located on an arc of a circle. The containers are, with their bottle necks to be closed, pressed as they are introduced into the closure device against the inner, fixed electrodes. The outer, movable electrodes are mounted for radial forward and rearward movement on the plate carrying the fixed electrodes or, if desired, on upwardly and downwardly movable slides mounted in guides on a rotating drum. By means of this design, the result is achieved that during the rearward movement of the electrodes the latter are lifted so that they can then be conveyed over the upper edge of the bottle mouths when the bottles or containers leave the conveyor chain. The movable electrodes are guided, by means of rollers travelling in a curved path on a stationary ring, against the container necks to be closed and the inner, fixed electrodes.

In order to allow the welding current to flow between the electrodes, the two electrodes must be applied to a source of voltage. Since the electrodes are moved continuously in a circle, it would normally be necessary to provide sliding contacts, sliding on a bus-bar, but this would involve considerable difficulty in the feed of high-frequency energy and might even prove impossible in practice.

In order to obviate these difficulties, it is proposed according to the invention to connect the two electrodes with a coupling coil preferably arranged directly adjacent them and arranged above which, with a specific angular range within which the welding operation is to be effected, there is an operating winding inducing the high-frequency current necessary for the welding operation on rotation into the coupling coil positioned in each case exactly below the operating winding. The operating winding is fed from a high-frequency generator, so that in this way there is no direct connection between the high-frequency generator and the moved electrodes.

In order to achieve the best possible and most satisfactory possible closure of the containers or of the bottle-necks thereof and in order to provide more satisfactory adaptation to the various container substances (this being of significance in view of the fixed length of the path during which the welding proper requires to be effected) there are arranged according to the invention, before the closure device on both sides of the passing containers and at the height of the bottle necks to be closed, in each case one radiation-heating member adapted to be moved forwardly and rearwardly and adjusted relatively thereto and consisting for example of a heating bar and a reflector surrounding approximately half of it. The reflector which is, in particular, double-walled has a cooling liquid flowing through it, in order that the bottle necks shall be heated only at the welding points without other parts of the container being exposed to the thermal effect of heat radiation. In place of an electrical heating rod, it is possible to provide gas-flame heating. If the contents of the bottles are inflammable, the bottle necks can advantageously be heated by means of hot air or other hot gases to the desired temperature. Flame or hot-gas or hot-air heating has the advantage of "aimed" heating of entirely specific, clearly-delimited zones and easy adjustability.

It is, if required, also possible to automatically control the heating element adapted to be moved forwardly; this can for example be done by means of thermostats so as to rapidly and automatically compensate for non-uniformity due to an accumulation of heat with consequent excessive heating of the bottle necks.

According to a further provision the heating element is also automatically recalled if the machine comes to a standstill.

In the case of flame or gas heating, it is unnecessary to provide for movability of the nozzle assemblies since in this case either the heating gas for the heating flames or the hot gas flowing out of nozzles against the container necks is adjusted in a simple manner, i.e. is adjusted in accordance with the conditions desired in each specific case or the adjustment can be varied.

The machine designed in accordance with the invention is equipped, in the direction of movement of the containers, behind the closure device, also with an automatically operating ejection device which again is controlled or actuated by the conveyor chain. This device consists of a movably mounted slide or the like which is guided against the container chain to be pressed out of the path of the conveyor chain and which is mounted on two parallel rocking levers which are pivoted via a pusher member moved by the control pins on the underside of the conveyor chain. By this means, with the aid of the slide, the conveyor chain is tilted transversely of the path which it has hitherto followed on to a chute upon which it passes to a punching machine which cuts the containers out of the foil strips surrounding them.

FIGURES 1 to 6 of the drawing show the subject of the invention with reference to a preferred embodiment which is described in greater detail hereinbelow.

In the drawings:

Figure 1:
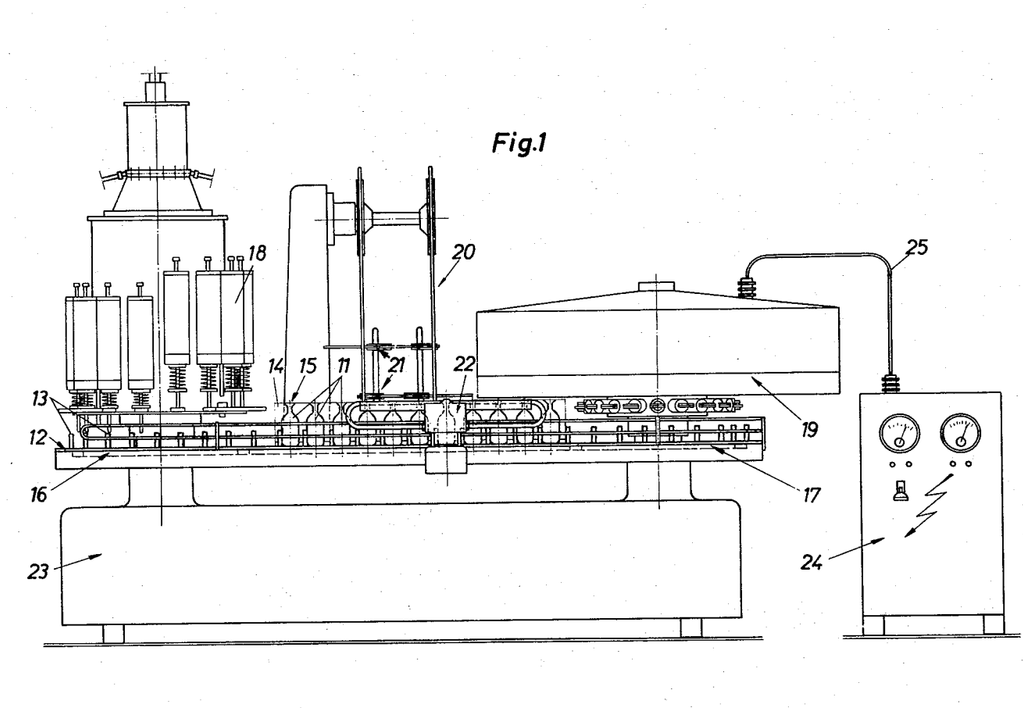
FIGURE 1 shows a lateral view of the machine according to the invention for the filling and closing of containers, in particular bottles manufactured from synthetic plastic foils.

FIGURE 1 shows the fundamental construction of the machine according to the invention for the filling and closing of containers 11, in particular bottles, which are manufactured from synthetic plastic foils and which are conveyed on an endlessly rotating conveyor chain 12 moving in a horizontal plane and on which are drive members 13 associated with each container 11. In each case, three bottles 11 are connected together and are arranged in a foil strip 14, thus constituting container aggregates or chains 15. The rotating, endless conveyor chain 12 is reversed at the two ends of the machine by the guide pulleys 16 and 17 upon which are suitable toothed rims. Above the guide pulley 16 is the filling device 18 and above the guide pulley 17 the closure device 19, both rotating in synchronism with the guide pulleys 16 and 17 or the conveyor chain 12. On one of the two longitudinal sides of the machine is the feed device 20 by means of which the container chains 15 are conveyed from the container machine (not shown) to the filling and closure machine and fed thereto. To this feed device 20 there also belongs the supply device 21 by means of which the container chains 15 are deposited at regular intervals on the conveyor chain 12. On the longitudinal side of the machine opposite the feed device 20, between the filling device 18 and the closure device 19 is the pre-heating device 22 for heating the material of the necks to be closed on the containers 11. The drive for the machine is disposed in the machine base 23. The high-frequency generator 24, which is set up laterally of the machine, is connected with the closure device 19 via the lead 25.

Figures 2, 2A, 2B:
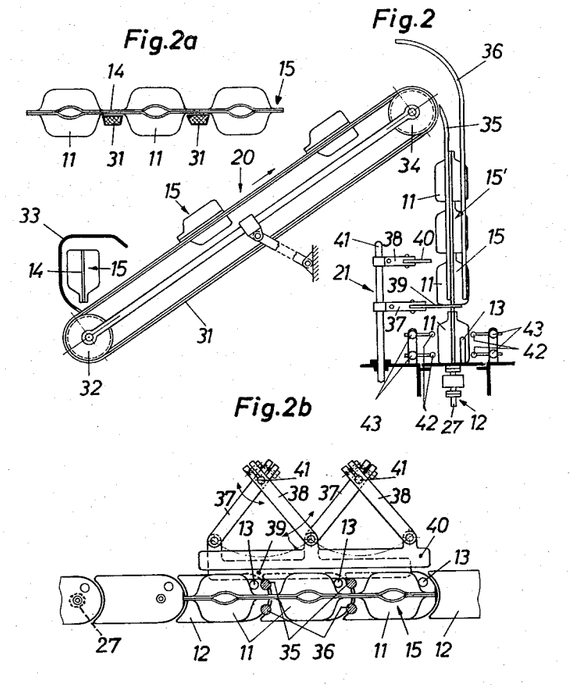
FIGURE 2 shows a lateral view of the feed device for the containers coming from the blowing and moulding machine on the conveyor chain of the machine, in a foil strip as a container chain.
FIGURE 2a shows a section through the conveyor belt of the feed device.
FIGURE 2b shows a view of the supply device of the feed device.

The feed device 20, which is shown in detail in FIGURES 2, 2a and 2b, consists of an obliquely upwardly extending conveyor belt formed by the endlessly rotating V-belts 31 which extend parallel to each other. The V-belts 31 are disposed side by side with spacings such that in every case the joints between two containers 11 in the foil strip 14 forming the container chain 15 bear upon them. The foil strips 14 cut off from an endless foil band issuing from the container machine are disposed above the lower guide pulley 32 of the V-belts 31 under a guide plate 33 which causes the container chain to drop in such manner on the V-belts 31 that the bottoms of the containers 11 are in every case disposed forwardly in the conveying direction. In the zone of the upper guide pulleys 34 of the V-belts 31 are guide rods 35, 36 which are parallel to each other in the vertical planes of the V-belts 31 and which diverge somewhat at the upper end; the guide rods 36 also engage somewhat over the upper guide pulleys 34 in order that the container chains 15 conveyed upwardly on the V-belts 31 may pass reliably between the guide rods 35 and 36 so as then to drop down between them. In the zone of the lower end of the guide rods 35, 36 there is provided the supply device 21 which includes the catch-plates 39 or 40 which catch the container chains 15 at the bottoms of the containers 11. The bearing arms 37 or 38 are adjustably secured on the pivotally mounted pivots 41. Laterally and above the conveyor chain 12 along the path on which the containers 11 or the container chains 15 are guided, at every point at which this is necessary, there are guide rails 42 having the form of railings which are secured on supports 43 and can be adjusted as to their lateral and vertical position relative to the containers.

The catch-plates 39 or 40 are secured, with their bearing arms 37 or 38, on the pivots 41 in such manner that in the case of a pivoting movement of the pivots 41 and of the bearing arms 37, 38 in one direction the lower catch-plate 39 is withdrawn relative to the container chain 15 and the upper catch-plate 40 is pushed forward. By this means, the container chain 15 disposed on the lower catch-plate 39 is able to drop downwardly on to the conveyor chain 12 and the next container chain 15′ positioned thereabove is caught up by the upper catch-plate 40. During the following, opposite movement, the lower catch-plate 39 is again pushed forward and the upper catch-plate 40 withdrawn, so that the container chain 15′ which is now the lowermost one is able to drop down on to the catch-plate 39.

The control pins 27 which are arranged on the conveyor chain 12 being, if each container chain 15 contains three containers 11, provided only on every third link of the conveyor chain 12, actuate an electric switch (not shown) by means of which an impulse is tripped for causing the pivoting movement of the pivots 41, so that the container chains 15 always drop on to the conveyor chain 12 at the correct point.

Figure 3:
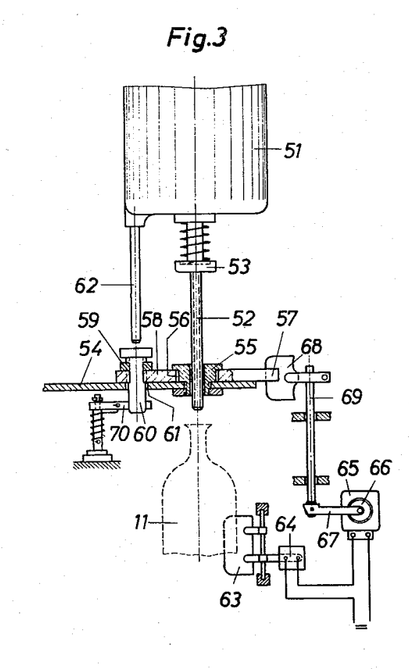
FIGURE 3 shows a detail of the part of the filling device, in diagrammatic illustration.

The containers 11 positioned one behind the other and fed on to the conveyor chain are then fed from the conveyor chain 12 to the filling device 18 which contains the per se known and conventional filling cylinders 51 provided at their lower end with a filling tube 52. The filling tube 52 is surrounded by the valve control disc 53 and is guided in a guide bush 55 mounted on the disc 54. Pivotally mounted about the bush 55 is the two-armed lever 56 the outer end 57 of which projects beyond the edge of the disc 54 and the inner end 58 of which is provided with a pin 59 the lower end 60 of which projects downwardly through a slot 61 in the disc 54. With an appropriate position of the pivotal lever 56, the end 58 of the lever 56 or the pin 59 thereof permits the feeler rod 62 connected with the filling cylinder 51 to pass through the aperture 61 when the cylinder 51 and with it the filling tube 52 and the feeler rod 62 are lowered.

If the feeler lever 63 arranged at a pre-determined point adjacent the guide path for the containers 11 ascertains that there is no container 11 at a specific point on the conveyor chain 12, the feeler lever 63 trips, via a contact 64, the electro-magnet 65 the armature 66 of which attracts the lever 67, whereby the flap 68 on the pivot 69 is pivoted and is displaced into the path of the outer end 57 of that lever 56 above which is disposed that filling cylinder which reaches the point at which there is no container 11 to be filled. In order to prevent the filling material from running out of the filling tube 52 into "space" (as the filling cylinder 51 is lowered) because there is no container 11 at that point, the inner end 58 with the pin 59, has, by pivoting the lever 56, been displaced under the lower end face of the feeler rod 62, so that the descending filling cylinder 51 is caught up during its downward movement by the feeler rod 62. Before the filling cylinder 51 has carried out a complete rotation about the drum axis and has again returned into its upper inoperative position, the lever 56 is restored by means of the resiliently mounted restoring lever 70, against which the lower end 60 of the pin 59 impinges, and the aperture 61 in the disc 54 for the feeler rod 62 is again freed.

The closure device 19 (FIGURE 4a) for the containers 11 or for the bottle necks 81 thereof, is disposed at the end of the machine opposite the filling device. On the plate 82 connected with the guide pulley 17 for the conveyor chain 12 are the electrode pairs 83, 84. On introduction into the closure device 19, the necks 81 of the bottles 11 bear against the fixed electrodes 83, suspended by means of insulators 85, whereas the movable electrodes are still at a height such that they can be moved over the upper edge of the bottle necks 81. The movable electrodes 84 are disposed on pins 87 resiliently mounted by means of springs in the retaining members 86. The retaining members 86 are mounted on the plate 82 by means of parallel rocking arms 88. By means of the springs 89, the remaining members 86 are drawn rearwardly and upwardly into their inoperative position out of which they are guided forwardly against the bottle necks 81 and the fixed inner counter-electrode 83 by the guideway 90 upon which travel the retaining members with their roller 91 arranged at the rearward end. Secured on the disc 82 are coupling coils 92 one of which is associated with each electrode pair 83, 84. One end 93 of each coupling coil 92 is connected with the plate 82 and therewith with that of each movable electrode 84; the other end 95, is carried by the insulator 94, of the coupling coil 92 is connected via the connecting lead 96 with the fixed electrode 83. Above the path of the coupling coil 92, over a specific angular range, there is a loop "representing" the operating winding, which is formed from a copper rail 98 suspended from insulators 97 and connected via the lead 25 with the generator 24, and which induces in each coupling coil 92 the necessary high-frequency current as each coupling coil 92 passes below the operating winding.

Figure 4A:
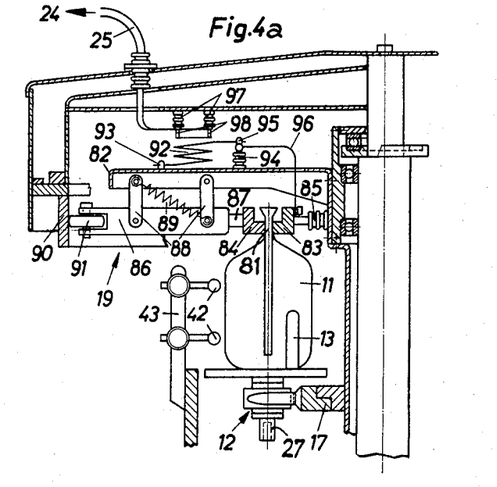
FIGURE 4a shows a radial section through the closure device, in diagrammatic illustration.

The coupling circuit in which the coupling coil 92 and the electrodes 83 and 84 are connected is adapted in such manner to the frequency of the energizing current that, if the electrodes are correctly spaced apart, compressing the neck 81 of the container 11 between them, the welding current will flow. If there is no bottle neck 81 between the electrodes 83, 84, this adaptation or synchronization of the coupling circuit is disturbed so that this current circuit draws only a small amount of energy out of the energizing circuit. Thus, the welding of bottle necks 81 is not detrimentally influenced if a container is occasionally missing and the electrodes positioned at that point are short-circuited or if, due to a material defect in the plastic foil, a short-circuit takes place during the welding process.

Figure 4B:
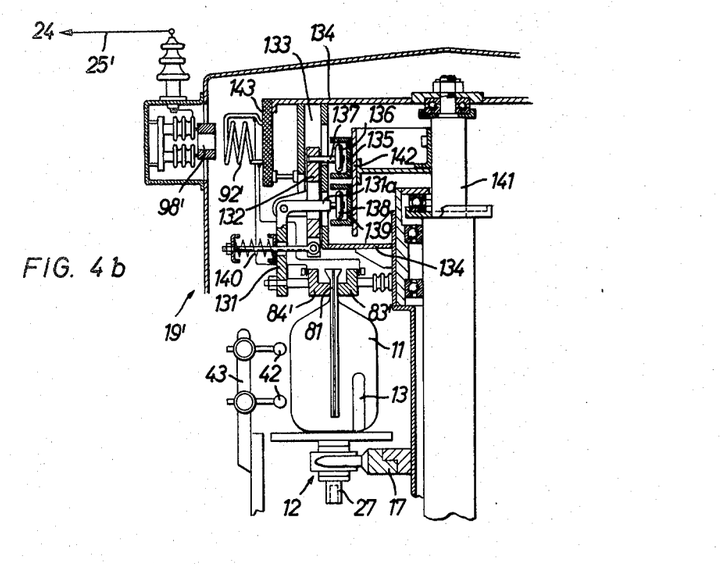
FIGURE 4b shows a radial section through the closure device of a second embodiment.

In the case of the second embodiment of a closure device 19' according to FIGURE 4b the construction corresponds fundamentally to that of the closure device 19 according to FIGURE 4a. In the case of this closure device 19', the external diameter is smaller, this being achieved by the arrangement whereby the movable electrodes 84' are disposed on bell-crank levers 131 pivotally mounted on a slide 132 in guides 133 secured for their part on the rotating drum part 134. The slides 132 slide in the guides 133 and are moved upwardly and downwardly by means of rollers 136 running in the control rail 135 and mounted on the stub axles 137 disposed on the slides. Travel rollers 138 arranged at the ends 131a of the bell crank levers 131 are displaced in the control rail 139 and move the arm 131a of the bell crank lever 131 upwardly and downwardly, so that the movable electrode 84' is moved backwardly and forwardly relative to the fixed electrode 83'. The pressure of the movable electrode 84' against the neck 81 of the bottle 11 bearing against the fixed electrode 83' is obtained by means of the adjustable spring 140. The control rails 135 and 139 are disposed on a drum 142 connected with the stationary shaft 141. Secured on the rotating part 134 are plates 143 which are made from an insulating material and which carry coupling coils 92' each end of which is connected with an electrode 83', 84' respectively. Opposite the path of the coupling coils 92' is a loop formed from a copper rail 98' and connected via the lead 25' with the generator 24, and which, as explained for FIG. 4a, induces the necessary high-frequency current in the respective coil 92'.

Figure 5A:
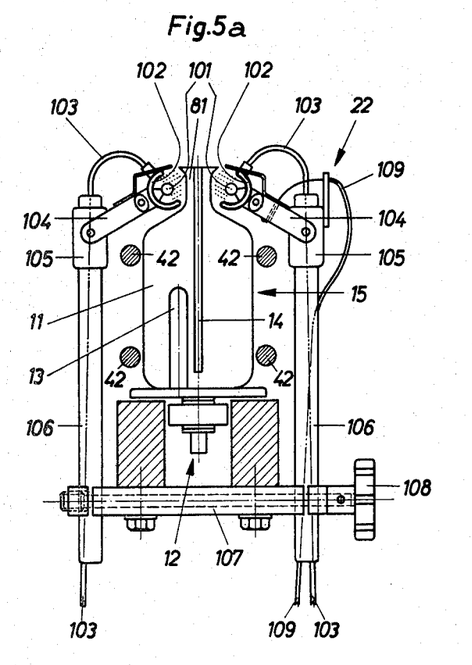
FIGURE 5a shows a lateral view of the pre-heating device for the container sleeve.

The pre-heating device 22 arranged (FIGURE 5a) before the closure device 19, for heating the necks 81 of the bottles 11 consists in this embodiment of the radiation heating bars 101 which are arranged on both sides of the bottle necks 81 and which are partially surrounded by reflectors 102 which are substantially semi-circular in cross-section, so that their heat radiation acts on the bottle necks 81. The reflectors 102 are double-walled and are connected via inlet and outlet means 103 to a circulating pump for a coolant. The reflectors 102 are articulated via pivoting arms 104 to the heads 105 of carrier rods 106 and are adjustable in any desired position. The carrier rods 106 are carried by a retaining means 107 and can be vertically adjusted after releasing the clamping screw 108. It is also possible, if so desired, and as indicated on the right-hand side of FIGURE 5a, to mount the arms 104 pivotally so that they can be automatically drawn upwardly by a Bowden cable 109, for example when the conveyor chain 12 is at a standstill, to prevent the radiation heating from acting further on the bottle necks 81 when the containers 11 are not moved.

Figure 5B:
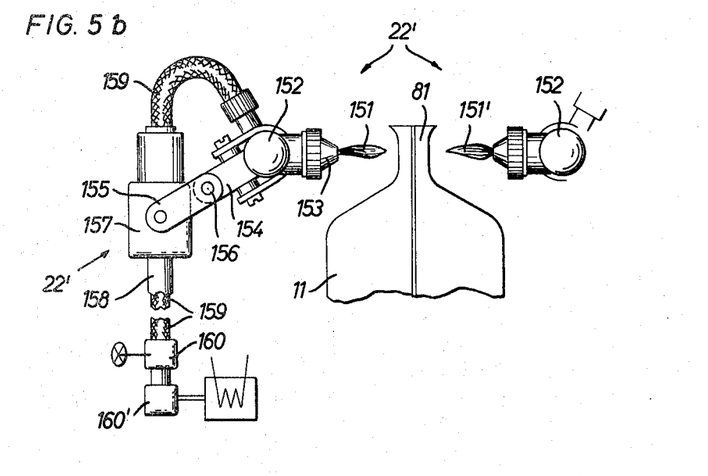
FIGURE 5b shows a lateral view of a second pre-heating device.

In the case of a further embodiment of the heating device 22', specific portions of the bottle necks 81 of the containers 11 are heated by flames 151 or jets of hot gases, in particular hot air (FIGURE 5b) directed from both sides towards the bottle neck 81. With this second embodiment of the pre-heating device 22', there is provided on both sides of the path of the containers 11 to be closed, at the level of the bottle necks 81, a tube 152 carrying a row of nozzles 153 out of which the combustible heating gas or a heated gas flows. The tube 152 is carried by pivotally mounted arms 154, 155 which are connected together by a hinge 156, so that the nozzles 153 can be adjusted in the position which is most advantageous in each case relative to the bottle necks 81 to be heated. The arms 155 are each disposed on a head member 157 mounted for vertical adjustment on vertical carrier rods 158. The feed of heating gases for the flames 151 or of hot gases to the tubes 152 is effected via flexible connecting tubes 159 preferably extending downwardly through the hollow vertical carrier rods 158 and being connected to the devices concerned in the interior of the frame. Preferably, there is disposed in the flexible pipe 159 an electro-valve 160' or similar valve 160 by means of which the gas feed to the tubes 152 can be interrupted in the simplest possible manner if this should be necessary, for example if the conveyor chain should for any reason whatsoever be brought to a standstill. In order to be able to regulate the gas flow, the control valve 160 can also be arranged in the pipe 159.

Figure 6:
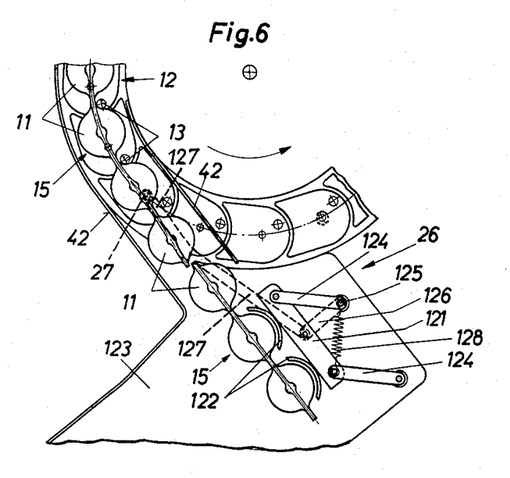
FIGURE 6 shows a view of the ejector device.

Disposed behind the closure device 19 is the ejection device according to FIGURE 6. The container chains 15 moved by the conveyor chain 12 are, after the closing of the containers 11, conveyed out of the path of the conveyor chain 12 by guide rails 42, this being done before the slide plate 121 of the ejection device 26. The slide plate 121 is formed with two channels 122 by means of which it contacts the container chain 15 and presses it out of the slideway, so that it drops on to a chute 123 which feeds it to the machine for punching out the bottles. The slide plate 121 is disposed on two parallel guide members 124. The pivot 125 of one of the two guide members 124 is provided with a lever arm 126 to which the pusher 127 is articulated. The end face of the pusher 127 is disposed in the path of the control pins 27 of the conveyor chain 12 arranged in every case, if a container chain 15 contains 3 containers 11, on every third chain member 13. The pusher 127 is pressed back by the control pin 27 so that the slide plate 121 is pressed parallel against the action of the spring 128.

What I claim is:

1. In a machine, for use in continuously filling and closing containers made from plastic sheet, multiples of said containers being interconnected to each other by substantially rigid webs of said plastic sheet and forming with the webs aggregates, the combination of an endless continuously movable conveyor chain adapted to convey each of said aggregates from a feed station to a delivery station, comprising linked carrier plates, two opposite end pulleys guiding said conveyor chain, a filling device disposed above one pulley, a closure device disposed above the other pulley, each of said filling and closure devices rotating in synchronism with its respective pulley, a feed device adapted to feed said aggregates to said conveyor chain and to deposit the same thereon at said feed station with the containers positioned uprightly, an ejection device adapted to deliver the aggregates at the delivery station away from said conveyor chain, and control means operable for automatically controlling said devices, said feed device including an inclined conveyor system adjustable as to inclination and comprising a plurality of V-belts adapted to engage said webs for supporting and transporting said aggregates, and parallel guide rods terminating above said conveyor chain at said feed station and adapted to guide said aggregates and including movable catch means operable for catching, and releasing for subsequent gravitational feed, said containers.

2. In a machine, as claimed in claim 1, said catch means comprising two catch plates disposed near said feed station and arranged one spaced above the other and each operable to be oscillated between projected and retracted positions, guide means operable for projecting one catch plate while retracting the other, the catch plate in the projected position extending into the path of descent of said aggregates, said control means including control pins formed on said conveyor chain operable to energize said guide means in timed relation with the passage of said carrier plates past said feed station.

3. In a machine, for use in continuously filling and closing containers made from plastic sheet, multiples of said containers being interconnected to each other by substantially rigid webs of said plastic sheet and forming with the webs aggregates, the combination of an endless continuously movable conveyor chain adapted to convey each of said aggregates from a feed station to a delivery station, comprising linked carrier plates, two opposite end pulleys guiding said conveyor chain, a filling device disposed above one pulley, a closure device disposed above the other pulley, each of said filling and closure devices rotating in synchronism with its respective pulley, a feed device adapted to feed said aggregates to said conveyor chain and to deposit the same thereon at said feed station with the containers positioned uprightly, an ejection device adapted to deliver the aggregates at the delivery station away from said conveyor chain, and control means operable for automatically controlling said devices, said filling device comprising a vertically reciprocable filling cylinder including a feeler rod, sensing means mounted adjacent said conveyor chain and including a detector tending to project into the path of said containers transported by said conveyor chain and operative to make a projection movement when in the row of containers one container is missing, said sensing means further including a blocking member normally spaced from the vertical path of said feeler rod and operable, in response to the projection movement of said detector, to move into the path of said feeler rod prior to the descent thereof thereby blocking the descent of the feeler rod and of the filling cylinder.

4. In a machine, as claimed in claim 3, said blocking member comprising a two-armed lever having one arm movable to and from said path of the feeler rod, spring means operable for returning said one arm to the normal position spaced from said path, and means interposed between said detector and said lever operable for translating the projection movement of said detector into an angular movement of said lever to position said one arm in said path.

5. In a machine, for use in continuously filling and closing containers made from plastic sheet, multiples of said containers being interconnected to each other by substantially rigid webs of said plastic sheet and forming with the webs aggregates, the combination of an endless continuously movable conveyor chain adapted to convey each of said aggregates from a feed station to a delivery station, comprising linked carrier plates, two opposite end pulleys guiding said conveyor chain, a filling device disposed above one pulley, a closure device disposed above the other pulley, each of said filling and closure devices rotating in synchronism with its respective pulley, a feed device adapted to feed said aggregates to said conveyor chain and to deposit the same thereon at said feed station with the containers positioned uprightly, an ejection device adapted to deliver the aggregates at the delivery station away from said conveyor chain, and control means operable for automatically controlling said devices, said closure device comprising a drum having a stationary section, and a revolving section rotating in synchronism with the conveyor chain, fixed insulated electrodes adapted to be abutted against by the container necks, said fixed electrodes connected to said revolving section and rotating with said drum though being radially immovable, movable electrodes connected to said revolving section and rotating with the drum and being movable radially to and from an inner sealing position and normally biased to be retracted outwardly from said sealing position, cam follower means formed on said movable electrodes, and peripheral cam means formed on said stationary section and engaging said cam follower means, said cam means and cam follower means being operable to move the successive movable electrodes towards said sealing position, and an electric circuit energizable from a source and comprising said electrodes and being operable to fuse each container neck as each movable electrode in succession is moved into the sealing position.

6. In a machine, as claimed in claim 5, a series of bell crank levers each mounting a movable electrode, a vertically movable slide pivotably mounting each bell crank lever, said cam and cam follower means comprising first rolls mounted on said bell crank lever, said rolls mounted on said slide, and said peripheral cam means including a first groove engaging said first rolls and a second groove engaging said second rolls, and resilient means biasing said movable electrodes towards the sealing position.

7. In a machine, as claimed in claim 5, said electric circuit including a series of circuit branches, each branch including a secondary coil and a fixed electrode and a movable electrode assigned to said fixed electrode and being rotatable with the revolving section, and a primary circuit including a primary coil disposed on the stationary section near the path of said secondary coils adapted to energize each secondary coil in succession.

8. In a machine, for use in continuously filling and closing containers made from plastic sheet, multiples of said containers being interconnected to each other by substantially rigid webs of said plastic sheet and forming with the webs aggregates, the combination of an endless continuously movable conveyor chain adapted to convey each of said aggregates from a feed station to a delivery station, comprising linked carrier plates, two opposite end pulleys guiding said conveyor chain, a filling device disposed above one pulley, a closure device disposed above the other pulley, each of said filling and closure devices rotating in synchronism with its respective pulley, a feed device adapted to feed said aggregates to said conveyor chain and to deposit the same thereon at said feed station with the containers positioned uprightly, an ejection device adapted to deliver the aggregates at the delivery station away from said conveyor chan, and control means operable for automatically controlling said devices, and heating means arranged adjacent the conveyor chain before the closure device including a movable heating element adjustably positioned adjacent the container necks.

9. In a machine, as clamed in claim 8, said heating element comprising a bar operable to be heated and to radiate heat, and a hollow reflector partially surrounding said heating bar and being internally fluid cooled.

10. In a machine, as claimed in claim 8, and means operable for automatically withdrawing the heating element from the bottlenecks when the machine is at standstill.

11. In a machine, for use in continuously filling and closing containers made from plastic sheet, multiples of said containers being interconnected to each other by substantially rigid webs of said plastic sheet and forming with the webs aggregates, the combination of an endless continuously movable conveyor chain adapted to convey each of said aggregates from a feed station to a delivery station, comprising linked carrier plates, two opposite end pulleys guiding said conveyor chain, a filling device disposed above one pulley, a closure device disposed above the other pulley, each of said filling and closure devices rotating in synchronism with its respective pulley, a feed device adapted to feed said aggregates to said conveyor chain and to deposit the same thereon at said feed station with the containers positioned uprightly, an ejection device adapted to deliver the aggregates at the delivery station away from said conveyor chain, and control means operable for automatically controlling said devices, said ejection device being arranged behind the closure device and comprising a plurality of grippers movable to and from a projected ejection position, said grippers in the ejection position engaging each aggregate and ejecting it from the path of the conveyor chains, resilient means normally retracting the grippers from the ejection position, and control pins arranged on some of the carrier plates of the conveyor chain and operable to move the grippers into the ejection position.

References Cited by the Examiner
UNITED STATES PATENTS

| | | | |
|---|---|---|---|
| 2,689,677 | 9/1954 | Unger | 53—266 |
| 2,721,017 | 10/1955 | Hiscock | 53—177 X |
| 2,877,121 | 3/1959 | Anderson et al. | 53—180 X |

FRANK E. BAILEY, *Primary Examiner.*

ROBERT A. LEIGHEY, *Examiner.*